United States Patent
Lin

(10) Patent No.: US 6,189,724 B1
(45) Date of Patent: Feb. 20, 2001

(54) CONTAINER

(76) Inventor: Shyn-Shen Lin, P.O. Box 90, Tainan City (TW)

( * ) Notice: Under 35 U.S.C. 154(b), the term of this patent shall be extended for 0 days.

(21) Appl. No.: 09/520,182

(22) Filed: Mar. 7, 2000

(51) Int. Cl.[7] .................................................. B65D 25/40
(52) U.S. Cl. ........................... 220/674; 220/675; 220/755
(58) Field of Search .................................. 220/674, 675, 220/669, 755

(56) References Cited

U.S. PATENT DOCUMENTS

| | | | |
|---|---|---|---|
| 5,299,710 | * | 4/1994 | Welsch et al. ......................... 220/675 |
| 5,499,730 | * | 3/1996 | Harbovr ................................ 220/675 |
| 5,810,195 | * | 9/1998 | Sim ....................................... 220/675 |
| 6,044,996 | * | 4/2000 | Caren et al. .......................... 220/675 |
| 6,112,925 | * | 9/2000 | Nahill et al. .......................... 220/675 |

* cited by examiner

Primary Examiner—Joseph M. Moy

(57) ABSTRACT

A container has a container body formed with horizontal and vertical grooves and square cone-shaped recessed separated by the grooves in an outer surface by a first injection process. Then the container body has slide-resistant decorations of soft material filled in the grooves and the recesses as integral in a second injecting process. The bottom of the container body also has a circular recess and a number of radial grooves extending out of the circular recess and filled with slide-resistant decorations. Then the container can be tightly held manually and stand on the surface of a table stabilized by means of the slide-resistant decorations.

3 Claims, 4 Drawing Sheets

CONTAINER

BACKGROUND OF THE INVENTION

This invention relates to a container, particularly to one having a number of horizontal and vertical grooves formed in a first injecting process, and filling the grooves with slide-resistant decorations in a second injecting process so that the containers may have much friction in holding or standing, without sliding down, and increasing its outer appearance beauty to enhance their value.

Common conventional containers generally have only one color, monotonous to have few variations. Some makers print patterns or pictures on an outer surface or adhere printed patterns or pictures on an outer surface to increase appearance beauty to attract customers. But printed or adhered colored patterns or pictures only present plane feeling, also monotonous with no 3D appearance, and may fade gradually or peel off to lose beauty. In addition, they have smooth glossy outer surfaces, so users may carelessly let them slip off to incline or fall down in holding them owing to too small friction, causing contents in them to splash around on clothing, the surface of a table or the ground, or they may break if worse. Especially, if a hand of a user is coated with oil, the hand may very easily slip off a container, so the user has to hold it with a big force lest the container should slip off. Some conventional containers have a grip at one side for holding, but if the container is full of contents, its gravity center is not stable, so a user has to hold it with a comparatively big force, and above all for small boys or persons having inactive hands.

SUMMARY OF THE INVENTION

The objective of the invention is to offer a container increased in its outer appearance beauty, and having much friction on the outer surface to hold, not easy to slip off a hand holding it, and stands stabilized on the surface of a table.

The main feature of the invention is a number of grooves formed in an outer surface in a first injecting process of a container, and slide-resistant decorations filled in the grooves in the second injection process.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
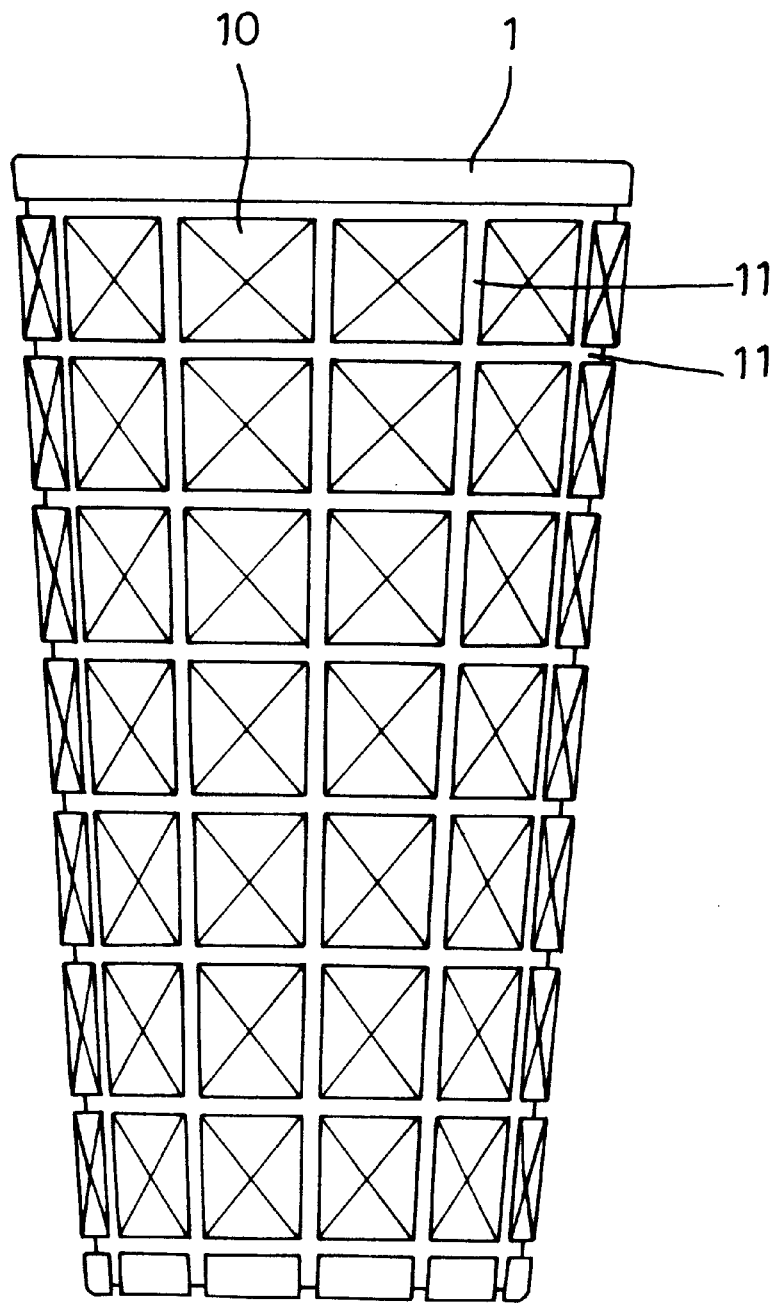
FIG. 1 is a front view of a container formed by a first injecting process in the present invention.
Figure 2:
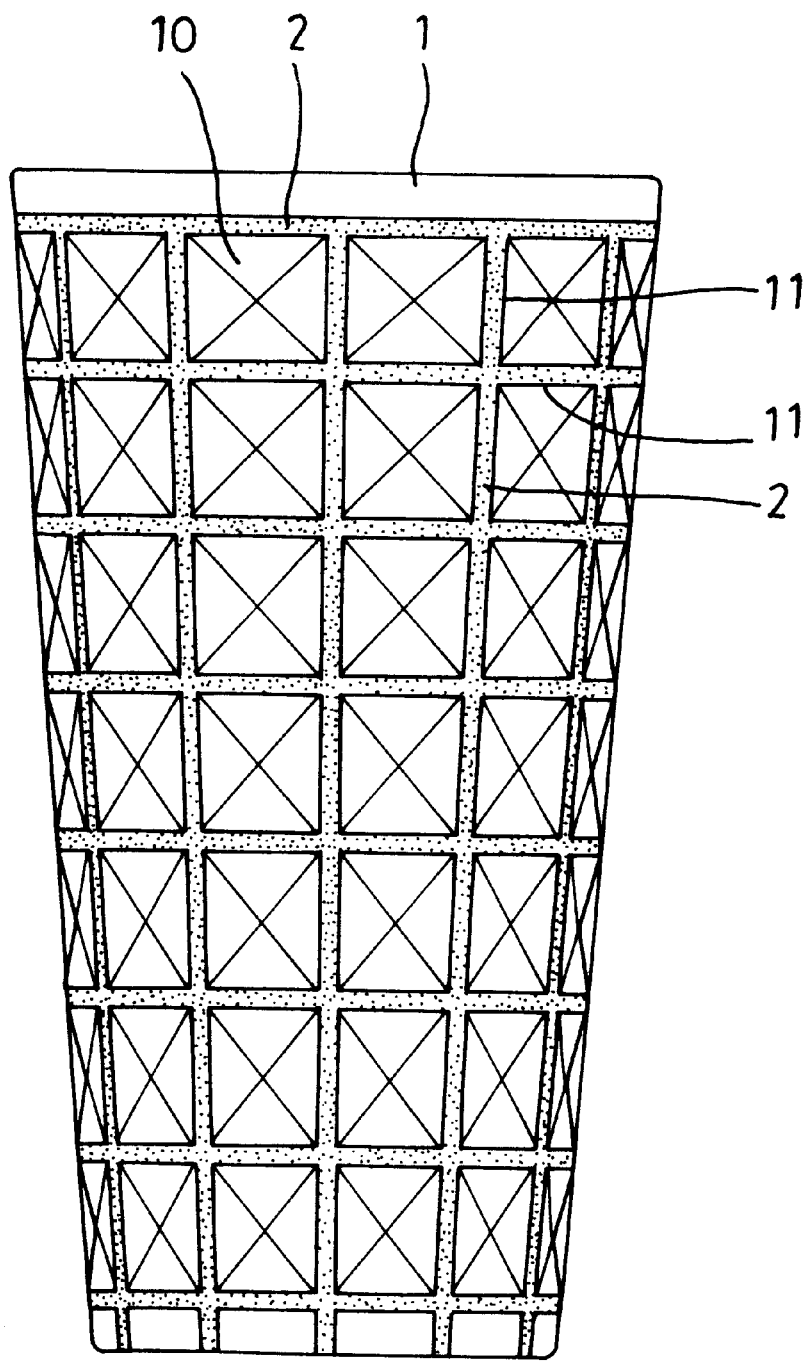
FIG. 2 is a front view of a container formed by a second injecting process in the present invention.
Figure 3:
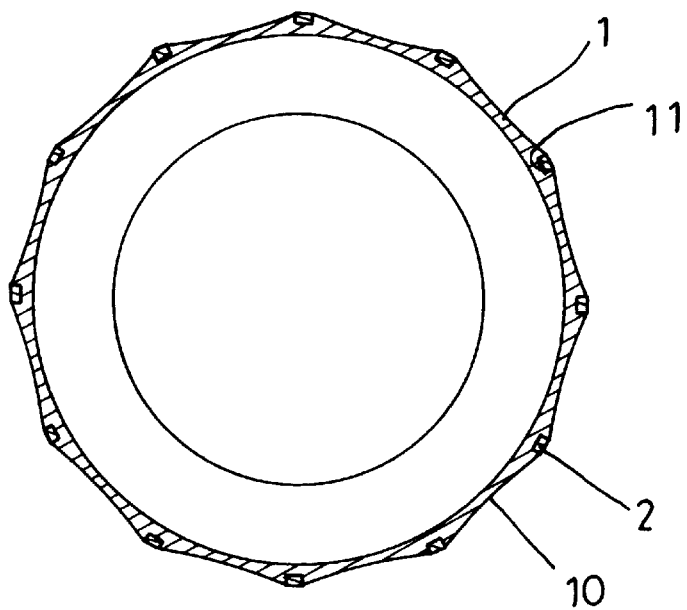
FIG. 3 is a cross-sectional view of the container in the present invention.

A preferred embodiment of a container in the present invention, as shown in FIGS. 1 and 2, has a container body 1 made of a hard material such acrylic by means of a first injecting process, having a number of square cone-shaped recesses 10 formed on an outer surface, a number of horizontal and vertical grooves 11 separating the square cone-shaped recesses 10 as shown in FIGS. 1 and 3, a circular recess 12 formed in a lower surface of the bottom of the container body 1, and a number of radial grooves 13 extending out from the circular recess 12 in the lower surface of the bottom. Further, the container body 1 has slide-resistant decorations 2 made of soft material such as PE, PP, etc.

Figure 4:
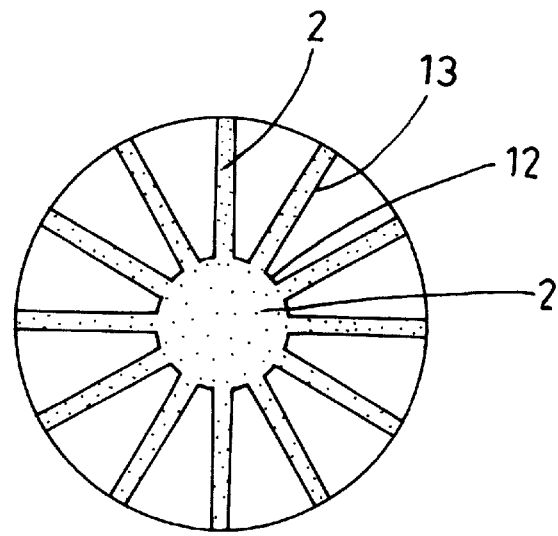
FIG. 4 is an bottom view of the bottom of the container in the present invention; and, FIG. 5 is a perspective view of the container in the present invention.
Figure 5:
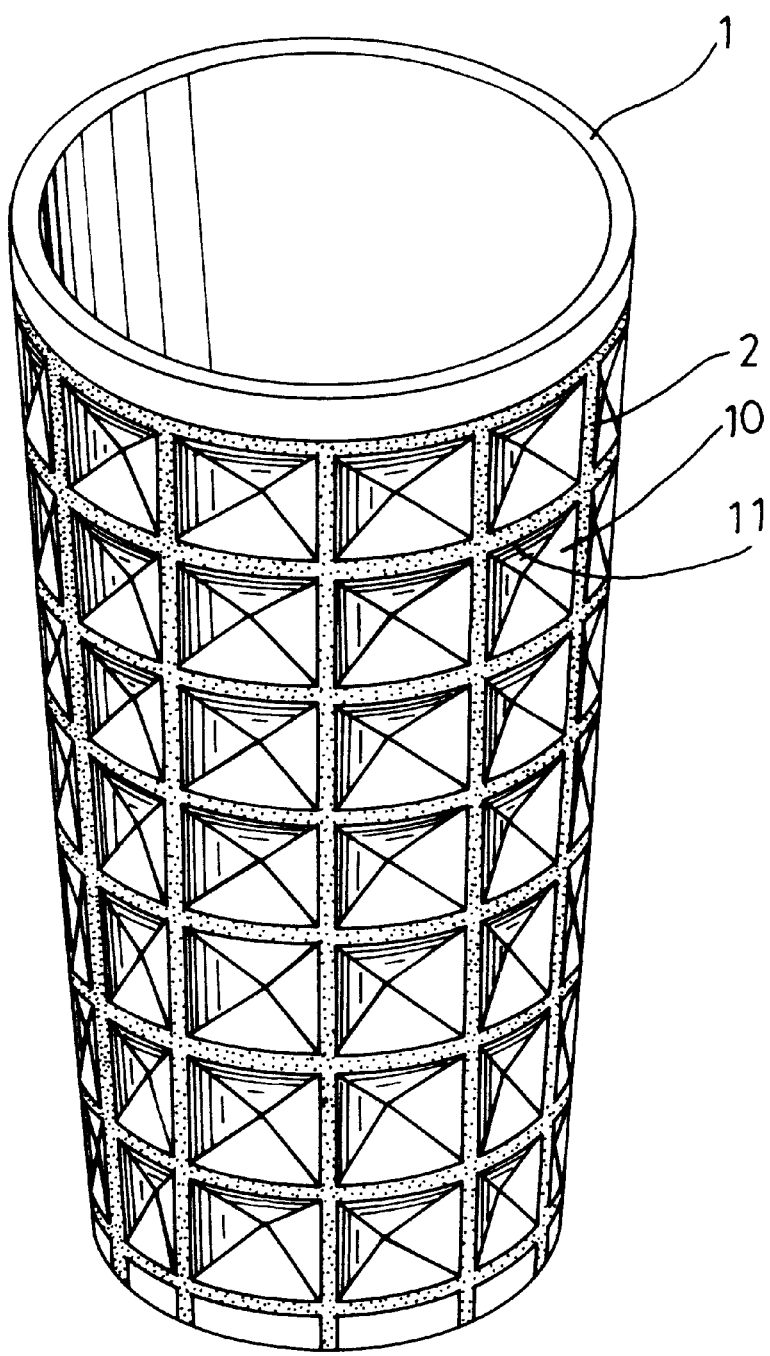

In manufacturing processes of the container in the present invention, first a container body 1 shown in FIG. 1 is formed by a first injecting process, and then the container body 1 is placed in a mold to receive a second injecting molding process to fill anti-resistant decorations 2 made of soft material in the grooves 11, the circular recess 12 and the radial grooves 13 formed in the lower surface of the bottom as shown in FIGS. 2, 3 and 4, integrating the anti-resistant decorations 2 with the container body 1 as shown in FIG. 5.

The finished container has the horizontal and the vertical grooves 11 in the annular wall, the radial grooves 13 and the circular recess 12 in the bottom filled with anti-resistant decorations 2, enhancing friction in holding the container, so the container can be held easily without slipping off. So a user may catch hold of the container with good touch, convenient and safe to move it. Further, the anti-resistant decorations 2 filled in the bottom can prevent the container from sliding by strong friction against the surface of a table, even if there should be some water on the surface. In addition, the square cone-shaped recesses filled with the anti-resistant decorations 2 may present beautiful appearance to eyes of onlookers, with the colors of the anti-resistant means 2 deflected by the recessed surfaces to permit the container look to have varied color alterations as a kaleidoscope does, elevating its worthiness as a product.

The container in the invention has the following advantages, as seen from the aforesaid description.

1. The anti-resistant decorations on the outer surface of the container increases friction between a hand and the container, so the container may be held tightly and moved safely.

2. The anti-resistant decorations in the bottom may increase friction between the container and the surface of a table so that the container may stand stabilized, not to slide around.

3. The anti-resistant decorations have visual effect of decoration, and 3D beautiful vision by means of the cone-shaped recesses, which deflect their colors to let the container look to have varied color alteration, enhancing worthiness as a product.

While the preferred embodiment of the invention has been described above, it will be recognized and understood that various modifications may be made therein and the appended claims are intended to cover all such modifications which may fall within the spirit and scope of the invention.

What is claimed is:

1. A container being formed by a first injecting process to have container body provided with a number of horizontal and vertical grooves formed in an outer surface, said container body integrated with anti-resistant decorations filled in said horizontal and the vertical grooves by a second injection process; said anti-resistant decorations filled in said grooves increasing friction in manual holding so as to let said container held tightly and safely, not slipping off a hand of a user, increasing visual appearance beauty to enhance worthiness as a product.

2. The container as claimed in claim 1, wherein a number of square cone-shaped recesses are formed in an outer surface of said container body, said recesses separated by said horizontal and said vertical grooves filled with said slide-resistant decorations, said recesses deflecting colors of said decorations, permitting said container look to have varied deflected color alterations.

3. The container as claimed in claim 1, wherein said container body has a lower surface of its bottom formed with a circular recess and a number of radial grooves extending out of said circular recess, said circular recess and said radial grooves also filled with slide-resistant decorations to increase friction between said container and the surface of a table.

* * * * *